(12) United States Patent  (10) Patent No.: US 8,074,037 B2
Zhang et al.  (45) Date of Patent: Dec. 6, 2011

(54) STORAGE SERVICE DEVICE WITH DUAL CONTROLLER AND BACKUP METHOD THEREOF

(75) Inventors: Xu-Ming Zhang, Tianjin (CN); Tom Chen, Taipei (TW)

(73) Assignee: Inventec Corporation, Taipei (TW)

( * ) Notice: Subject to any disclaimer, the term of this patent is extended or adjusted under 35 U.S.C. 154(b) by 306 days.

(21) Appl. No.: 12/414,338

(22) Filed: Mar. 30, 2009

(65) Prior Publication Data

US 2010/0250832 A1 Sep. 30, 2010

(51) Int. Cl.
*G06F 12/00* (2006.01)
*G06F 12/02* (2006.01)

(52) U.S. Cl. ............... 711/162; 711/103; 711/E12.001; 711/E12.002

(58) Field of Classification Search .............. 711/162, 711/103, E12.001, E12.002
See application file for complete search history.

(56) References Cited

U.S. PATENT DOCUMENTS

2003/0074535 A1* 4/2003 Owhadi ............... 711/162
2009/0132760 A1* 5/2009 Flynn et al. ............ 711/113
* cited by examiner

*Primary Examiner* — Yong Choe
(74) *Attorney, Agent, or Firm* — Morris Manning & Martin LLP; Tim Tingkang Xia, Esq.

(57) ABSTRACT

A storage service device with a dual controller and a backup method thereof are applicable to provide the same view service to an event-login log and a configuration file of a server. The storage service device includes a first control module, a second control module, a battery unit, a basic input/output system (BIOS), and a backup procedure. Once a power failure occurs to the server, the following backup procedure is performed a hardware interrupt signal is sent to the battery unit, so as to provide an operation power to a first memory module and a second memory module; an index page of the first memory module is synchronized with that of the second memory module; and the updated index pages are recorded into a first flash memory and a second flash memory respectively.

5 Claims, 5 Drawing Sheets

STORAGE SERVICE DEVICE WITH DUAL CONTROLLER AND BACKUP METHOD THEREOF

BACKGROUND OF THE INVENTION

1. Field of the Invention

The present invention relates to a data backup method for a server, and more particularly, to a storage service device with a dual controller and a backup method thereof.

2. Related Art

In order to enhance the access performance of a storage device, a storage service device with a dual controller has been proposed. Compared with the configuration of a single controller, the dual controller can provide the same service to a plurality of clients at the same time.

In the past, in order to ensure that a plurality of clients has the same operation environment, the dual-controller storage service device employs the same view function. The same view function mainly aims at preventing the clients from having different operation environments and services due to the different controllers adopted for the provided services when the clients are connected to the storage device. For example, when the system has created a virtual disk in a first controller, if another client is connected to the storage service device through a second controller, the client can also see the virtual disk.

In addition to the same view function, a "mirror cache" function is also proposed, so as to enable the dual controller to ensure the data synchronization in the dual controller when accessing data. The mirror cache means to configure a respective cache in each controller. Thus, when a first controller receives/retrieves data, it may copy the data stored temporarily in the cache thereof into a cache of a second controller, thereby ensuring that the two controllers have consistent data. Moreover, when an error occurs to one of the two controllers, the storage service device can recover the lost data from the cache of the other controller.

In order to maintain the consistency between the index pages of the two controllers, configuration files and login files are stored in a flash memory or a hard disk in the prior art. Although the storage purpose can be effectively achieved, it takes risks in terms of the storage security. Taking the flash memory for example, due to the limited accessing times for the flash memory, once the flash memory is damaged, the entire system may be crashed due to the loss of relevant data. Taking the hard disk for example, because the hard disk belongs to a mechanical access mode, the hard disk cannot be moved while performing motions; otherwise, the hard disk is easily destroyed.

SUMMARY OF THE INVENTION

In view of the above problems, the present invention is mainly a storage service device with a dual controller, which is applicable to provide the same view service to an event-login log and a configuration file of a server.

To achieve the above objective, a storage service device with a dual controller is provided in the present invention, which comprises a first control module, a second control module, a battery unit, a basic input/output system (BIOS), and a backup procedure. The first control module comprises a first memory module and a first flash memory. The first control module further comprises an index page used for recording an access address of a virtual disk in the storage device. The second control module is electrically connected to the first control module. The second control module comprises a second memory module and a second flash memory, and stores another index page. The battery unit is electrically connected to the first memory module and the second memory module. The BIOS is electrically connected to the battery unit, the first control module, and the second control module. The BIOS further comprises the backup procedure. When a power failure occurs to a server, the BIOS executes the backup procedure, that is, sending a hardware interrupt signal to the battery unit, so as to provide an operation power to the first memory module and the second memory module; synchronizing the index page of the first memory module with that of the second memory module; and recording updated index pages into the first flash memory and the second flash memory respectively.

From another aspect, the present invention is a backup method for a storage service device with a dual-controller, in which the dual controller has a first controller and a second controller communicating with each other, the first controller is configured with a first memory module and a first flash memory, and the second controller is configured with a second memory module and a second flash memory.

To achieve the above objective, a backup method for a dual-controller storage service device is provided in the present invention, which comprises the following steps. When a power failure occurs to a server, a hardware interrupt signal is sent to a battery unit, so as to provide an operation power to the first memory module and the second memory module; an index page of the first memory module is synchronized with that of the second memory module; and updated index pages are recorded into the first flash memory and the second flash memory respectively.

The present invention provides a backup method combining battery backup with remote direct memory access (RDMA), which is applicable to achieve data backup and synchronization for a multi-controller server. In addition to periodically back up a configuration file for each controller, the present invention further achieves the backup and synchronization of the above configuration files in the case of a power failure. Thus, the same view performance of the server can be effectively improved.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
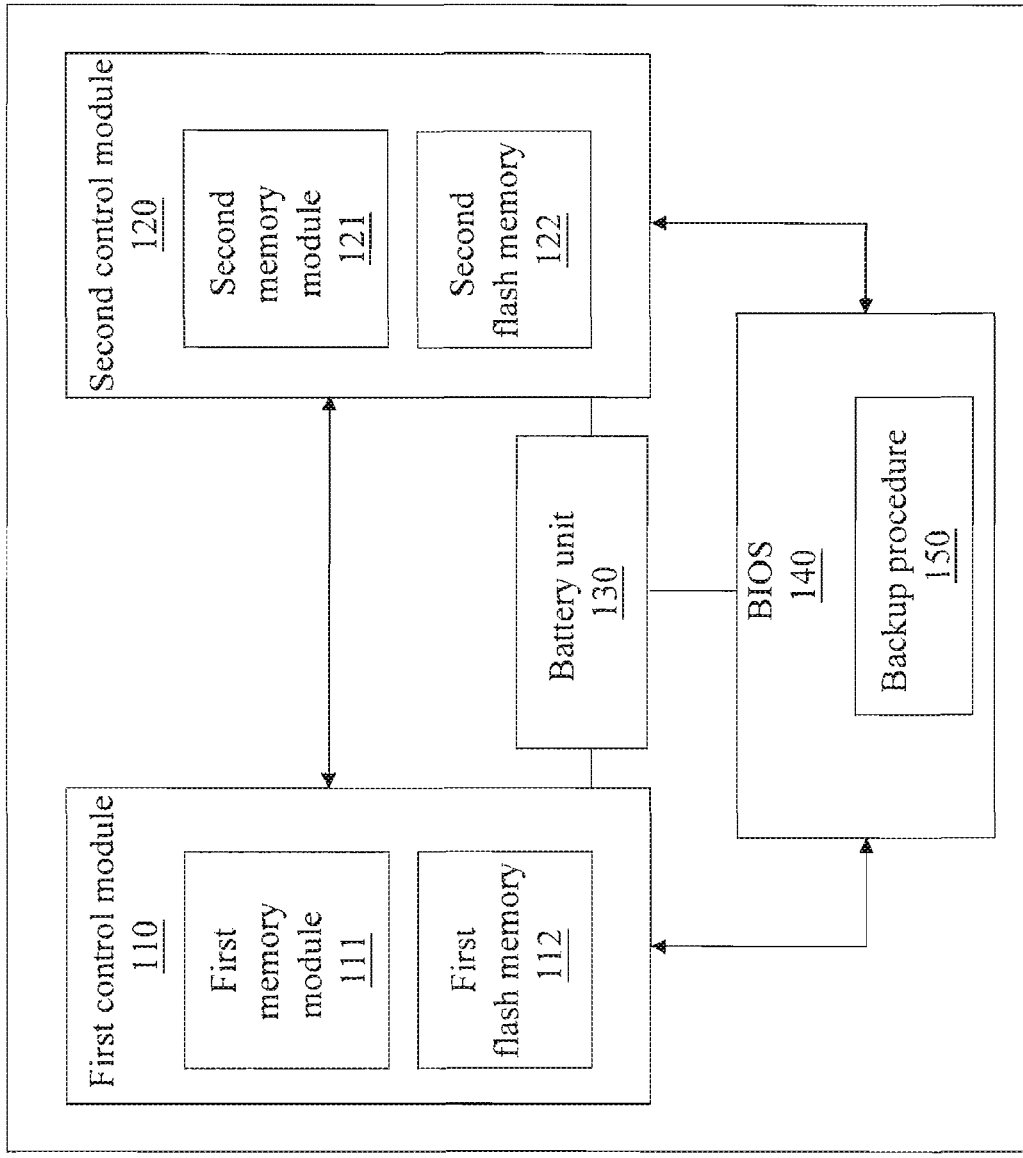
FIG. 1 is a schematic architecture view of the present invention.

FIG. 1 is a schematic architecture view of the present invention. Referring to FIG. 1, a storage system of the present invention comprises a first control module 110, a second control module 120, a battery unit 130, a Basic Input/Output System (BIOS) 140, and a backup procedure 150. The first control module 110 comprises a first memory module 111 and a first flash memory 112. The first control module 110 further comprises an index page used for recording an access address of a virtual disk in the storage device. The second control module 120 is electrically connected to the first control module 110. The first control module 110 and the second control module 120 Are connected through Serial-Attached SCSI (SAS) or Ethernet. The second control module 120 comprises a second memory module 121 and a second flash memory 122, and stores another index page. The battery unit 130 is electrically connected to the first memory module 111 and the second memory module 121. The BIOS 140 is electrically connected to the battery unit, the first control module 110, and the second control module 120. The BIOS 140 further comprises the backup procedure 150.

In order to improve the data storage reliability of a multi-controller storage system, remote direct memory access (RDMA) and battery backup are adopted here. The RDMA is a mapping means for remote memories, which can map the memories of the multiple controllers synchronously through internet or another connection mode. When the file of one controller is modified, the files of the other controllers can also be updated. The battery backup assures that the storage system can save the files of the controllers even when a power failure occurs to the storage system.

Figure 2:
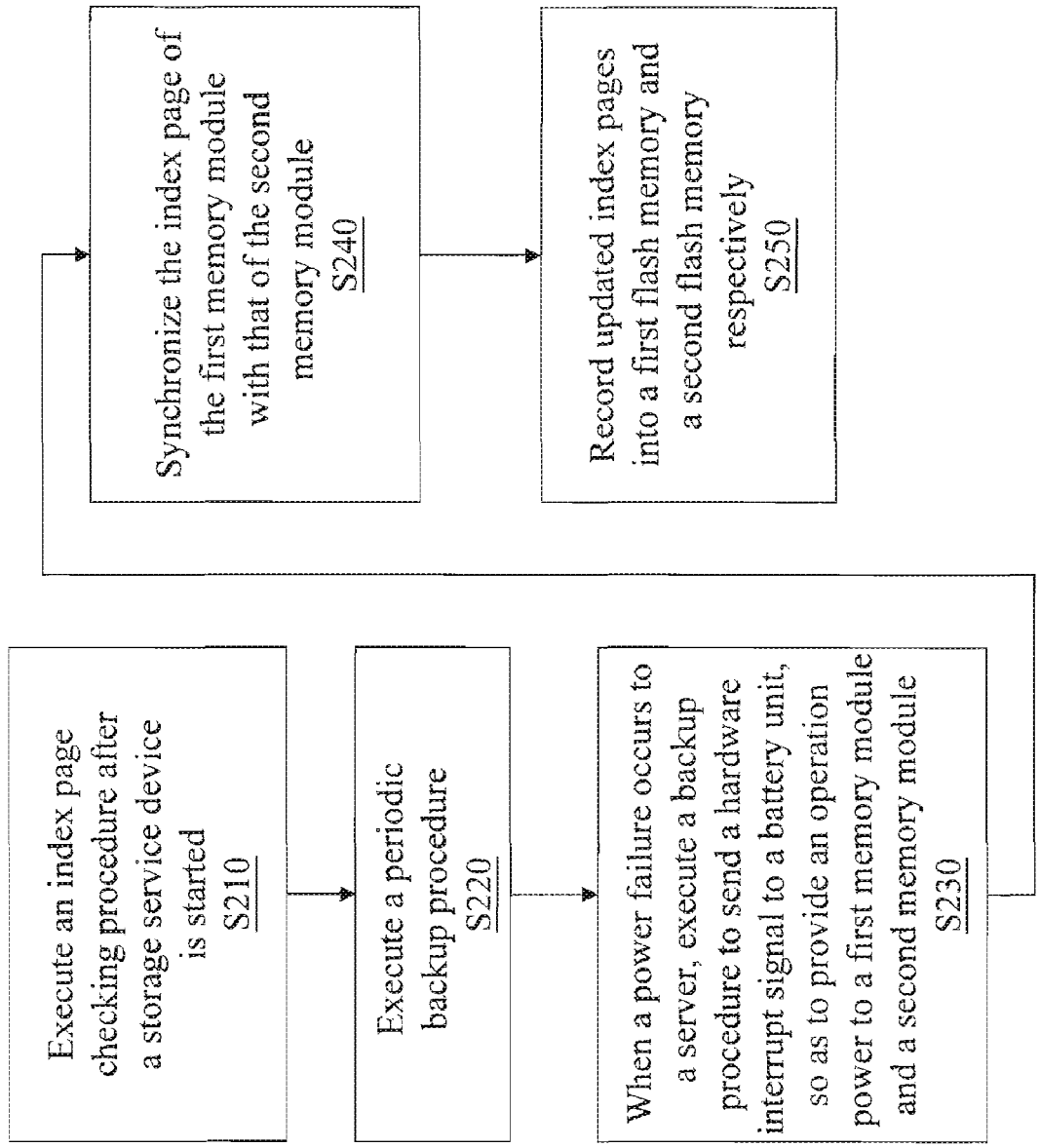
FIG. 2 is a schematic flow chart of the present invention.

Once a power failure occurs to the storage service device, the BIOS 140 may execute the backup procedure 150 for synchronizing and backing up the configuration files and login files of the controllers. FIG. 2 is a schematic flow chart of the present invention.

In Step S210, an index page checking procedure is executed after a storage service device is started.

In Step S220, a periodic backup procedure is executed to synchronize and back up the index page of each controller periodically.

In Step S230, when a power failure occurs to a server, a backup procedure is executed to send a hardware interrupt signal to a battery unit, so as to provide an operation power to a first memory module and a second memory module.

In Step S240, the index page of the first memory module is synchronized with that of the second memory module.

In Step S250, updated index pages are recorded into a first flash memory 112 and a second flash memory respectively.

Figure 3:
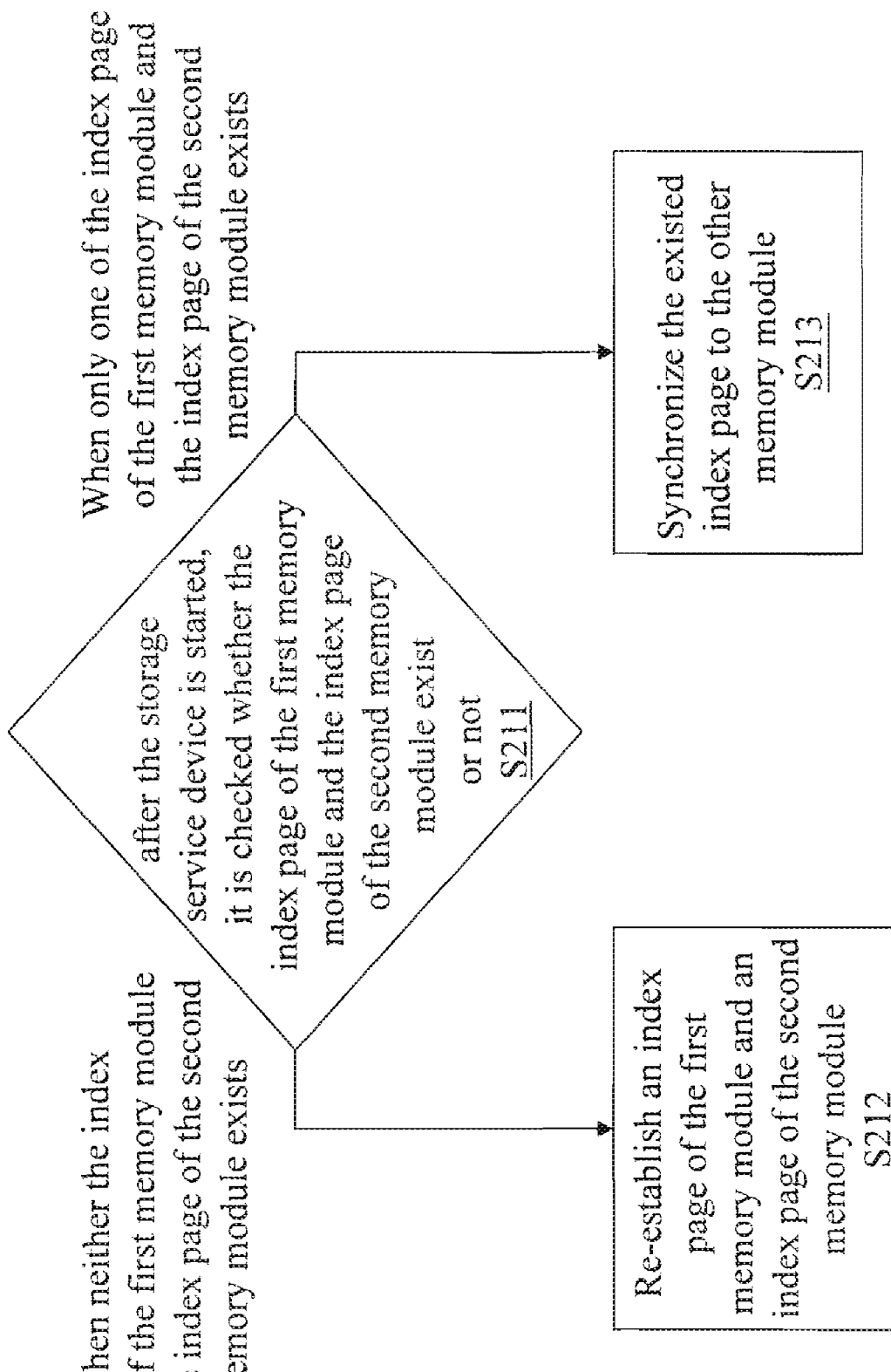
FIG. 3 is a schematic flow chart of an index page checking procedure of the present invention.

After the server is started, each controller begins to execute the index page checking procedure. FIG. 3 is a schematic flow chart of an index page checking procedure of the present invention. Referring to FIG. 3, the index page checking procedure comprises the following steps.

In Step S211, after the storage service device is started, it is checked whether the index page of the first memory module and the index page of the second memory module exist or not.

In Step S212, when neither the index page of the first memory module nor the index page of the second memory module exists, an index page of the first memory module and an index page of the second memory module are re-established.

In Step S213, when only one of the index page of the first memory module and the index page of the second memory module exists, the existed index page is synchronized to the other memory module.

In the present invention, the way of establishing an index page can be adjusted adaptively according to different operating system. For Linux operating system, the index page is established by means of retaining the address of the index page at a lower position of the memory through the kernel of Linux. In this way, it can be assured that the index page is established at the same physical address each time when the server is started. The index page contains configuration files, login files, addresses of memory pages used by virtual disks, locks of the memory pages, and updating time of the memory pages.

Figure 4:
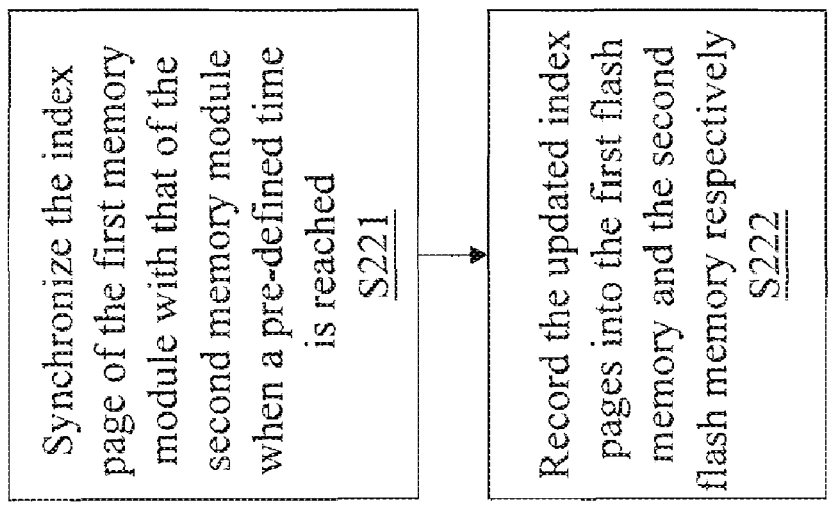
FIG. 4 is a schematic flow chart of a periodic backup procedure of the present invention.

After completing the above steps, the server executes the backup procedure 150 periodically. The backup procedure 150 updates the configuration files of the controllers synchronously. FIG. 4 is a schematic flow chart of a periodic backup procedure of the present invention. Referring to FIG. 4, the periodic backup procedure 150 comprises the following steps.

In Step S221, the index page of the first memory module is synchronized with that of the second memory module when a pre-defined time is reached.

In Step S222, the updated index pages are recorded into the first flash memory and the second flash memory respectively.

In the present invention, the first control module 110 and the second control module 120 are connected through SAS or Ethernet. When executing the periodic backup procedure 150, each controller is further monitored in real time to see whether each controller is active. If only one controller is active, the server synchronizes the older configuration files by using the latest configuration files for updating.

Figure 5:
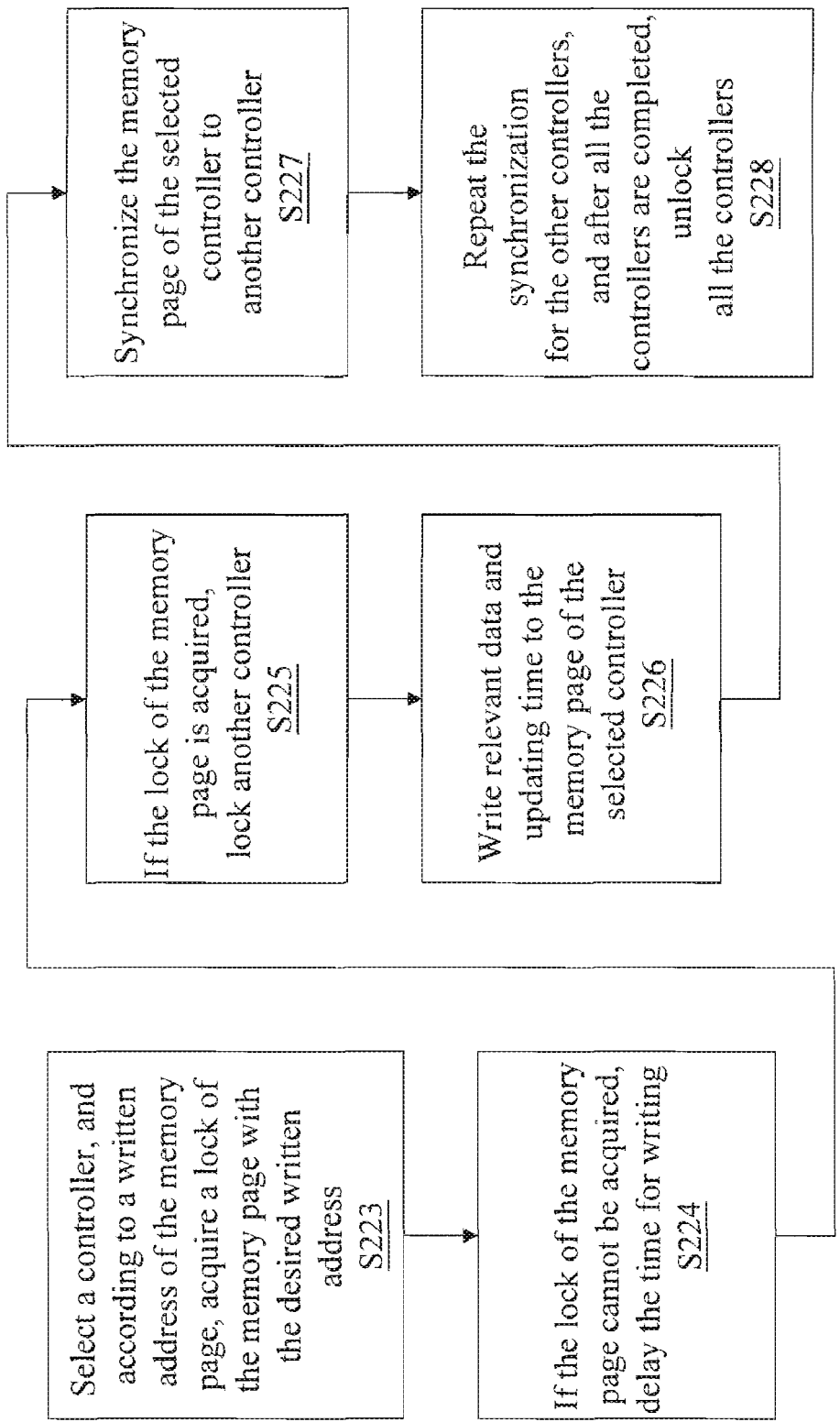
FIG. 5 is a flow chart of a data writing motion.

The process of updating the configuration files of multiple controllers further comprises the following steps, which are illustrated with reference to FIG. 5.

In Step S223, a controller is selected, and according to a written address of the memory page, a lock of the memory page with the desired written address is acquired.

In Step S224, if the lock of the memory page cannot be acquired, the time for writing is delayed.

In Step S225, if the lock of the memory page is acquired, another controller is locked.

In Step S226, relevant data and updating time are written to the memory page of the selected controller.

In Step S227, the memory page of the selected controller is synchronized to another controller.

In Step S228, the synchronization is repeated for the other controllers, and after all the controllers are completed, all the controllers are unlocked.

The present invention provides a backup method combining battery backup with remote direct memory access (RDMA), which is applicable to achieve data backup and synchronization for a multi-controller server. In addition to periodically back up a configuration file for each controller, the present invention further achieves the backup and synchronization of the above configuration files in the case of a power failure. Thus, the same view performance of the server can be effectively improved.

What is claimed is:

1. A storage service device with a dual controller, applicable to provide the same view service to an event-login log and a configuration file of a server, the storage service device comprising:
    a first control module, comprising a first memory module and a first flash memory, wherein the first control module stores an index page used for recording an access address of a virtual disk in the storage service device;
    a second control module, electrically connected to the first control module, and comprising a second memory module and a second flash memory, wherein the second control module stores another index page therein;
    a battery unit, electrically connected to the first memory module and the second memory module; and
    a basic input/out system (BIOS), electrically connected to the battery unit, the first control module, and the second control module, and comprising a backup procedure, wherein once a power failure occurs to the server, the BIOS executes the backup procedure:

sending a hardware interrupt signal to the battery unit, so as to provide an operation power to the first memory module and the second memory module;

synchronizing the index page of the first memory module with that of the second memory module; and recording updated index pages into the first flash memory and the second flash memory respectively.

2. The storage service device with a dual controller according to claim 1, wherein the index page comprises configuration files, login files, an address of a memory page, a lock of the memory page, and an updating time of the memory page.

3. The storage service device with a dual controller according to claim 1, further comprising an index page checking procedure, wherein the index page checking procedure comprises:

respectively checking whether the index page of the first memory module and the index page of the second memory module exist or not, after the storage service device is started;

when neither the index page of the first memory module nor the index page of the second memory module exists, re-establishing an index page of the first memory module and an index page of the second memory module; and when only one of the index page of the first memory module and the index page of the second memory module exists, synchronizing the existed index page to the other memory module.

4. The storage service device with a dual controller according to claim 1, wherein the first control module and the second control module are connected through Serial-Attached SCSI (SAS) or Ethernet.

5. The storage service device with a dual controller according to claim 1, further comprising a periodic backup procedure, wherein the periodic backup procedure comprises:

synchronizing the index page of the first memory module with the index page of the second memory module when a pre-defined time is reached; and recording updated index pages into the first flash memory and the second flash memory respectively.

* * * * *